United States Patent
Suehiro et al.

(10) Patent No.: US 8,097,371 B2
(45) Date of Patent: Jan. 17, 2012

(54) HYDROGEN GENERATOR, FUEL CELL SYSTEM COMPRISING THE SAME, AND OPERATION METHOD THEREOF

(75) Inventors: Masanori Suehiro, Hyogo (JP); Hideo Ohara, Osaka (JP); Masataka Ozeki, Osaka (JP); Kiyoshi Taguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 702 days.

(21) Appl. No.: 12/296,795

(22) PCT Filed: Apr. 11, 2007

(86) PCT No.: PCT/JP2007/057952
§ 371 (c)(1),
(2), (4) Date: Oct. 10, 2008

(87) PCT Pub. No.: WO2007/119736
PCT Pub. Date: Oct. 25, 2007

(65) Prior Publication Data
US 2009/0280363 A1 Nov. 12, 2009

(30) Foreign Application Priority Data
Apr. 11, 2006 (JP) ................... 2006-108257

(51) Int. Cl.
*H01M 8/06* (2006.01)
(52) U.S. Cl. ........................................ 429/408
(58) Field of Classification Search .............. 429/408, 429/416, 426, 425; 422/105–111
See application file for complete search history.

(56) References Cited

U.S. PATENT DOCUMENTS

| 7,135,050 B2 * | 11/2006 | Asou et al. | 48/127.9 |
| 7,536,981 B2 * | 5/2009 | Sadikay | 123/1 A |
| 2002/0150800 A1 | 10/2002 | Asou et al. | |
| 2004/0037761 A1 | 2/2004 | Maenishi et al. | |
| 2007/0196267 A1 * | 8/2007 | Carpenter et al. | 423/648.1 |

FOREIGN PATENT DOCUMENTS

| JP | 6-333587 | 12/1994 |
| JP | 2001-165431 | 6/2001 |
| JP | 3212181 B2 | 7/2001 |
| JP | 2001-302207 | 10/2001 |
| JP | 2002-267159 | 9/2002 |
| JP | 2003-20204 | 1/2003 |
| JP | 2004-39420 | 2/2004 |
| JP | 2005-26033 | 1/2005 |
| JP | 3718391 B2 | 9/2005 |
| JP | 3708428 B2 | 10/2005 |

* cited by examiner

*Primary Examiner* — Phuong Dinh
(74) *Attorney, Agent, or Firm* — McDermott Will & Emery LLP

(57) ABSTRACT

A hydrogen generator comprises a reformer which generates a hydrogen-containing gas from a steam and a material gas, a first gas supply device which supplies the material gas, a combustor which combusts an exhaust gas exhausted from the reformer to heat the reformer, a combustion air supply device which supplies air to the combustor, a second gas supply device which supplies another gas different from the material gas to the reformer or to a passage connecting the reformer to the combustor, and a controller. The controller is configured to control the combustion air supply device to increase an amount of the air supplied to the combustor (S103), in association with start of supply of the another gas from the second gas supply device (S104), in a state where the material gas is supplied from the first gas supply device to the reformer and the exhaust gas is combusted in the combustor (S101).

8 Claims, 6 Drawing Sheets

| | BEFORE SUPPLY OF REFORMING WATER | JUST AFTER SUPPLY OF REFORMING WATER | AFTER FILLING STEAM |
|---|---|---|---|
| TOTAL FLOW RATE (L/MIN) | $Q_{mat}$ | $Q_{mat} + Q_{wat}$ | $Q_{mat} + Q_{wat}$ |
| AMOUNT OF MATERIAL GAS SUPPLIED TO BURNER (L/MIN) | $Q_{mat}$ | $Q_{mat} + Q_{wat}$ | $Q_{mat}$ |
| MATERIAL GAS CONCENTRATION IN GAS SUPPLIED TO BURNER (%) | 100 | 100 | $\dfrac{Q_{mat}}{Q_{mat}+Q_{wat}} \times 100$ |
| AIR SUPPLY AMOUNT REQUIRED FOR PERFECT COMBUSTION (L/MIN) | $\alpha Q_{mat}$ | $\alpha(Q_{mat} + Q_{wat})$ | $\alpha Q_{mat}$ |

Fig. 2

HYDROGEN GENERATOR, FUEL CELL SYSTEM COMPRISING THE SAME, AND OPERATION METHOD THEREOF

RELATED APPLICATIONS

This application is the U.S. National Phase under 35 U.S.C. §371 of International Application No. PCT/JP2007/057952, filed on Apr. 11, 2007, which in turn claims the benefit of Japanese Application No. 2006-108257, filed on Apr. 11, 2006, the disclosures of which Applications are incorporated by reference herein.

TECHNICAL FIELD

The present invention relates to a fuel cell system, a hydrogen generator, and an operation method thereof. More particularly, the present invention relates to a hydrogen generator which is configured to use combustion heat of a material gas to heat the hydrogen generator in a start-up state, a fuel cell system comprising the same, and an operation method thereof.

BACKGROUND ART

A cogeneration system using a fuel cell typically includes a hydrogen generator having a reformer, and a fuel cell. The reformer includes a reactor filled with a reforming catalyst for catalyzing a steam reforming reaction, and a combustor for heating the reactor with combustion heat. A material gas such as a hydrocarbon based gas and a steam are flowed in the reactor which has been heated, causing the steam reforming reaction to occur. As a result, a hydrogen-containing gas is generated. The hydrogen-containing gas which has been exhausted from the reformer is returned to the combustor through the fuel cell or the like and is combusted therein, thereby heating the reactor. The heating enables the supply of the heat necessary for the steam reforming reaction which is an endothermic reaction.

In some cases, the hydrogen generator includes a shift converter and a purifier to reduce a carbon monoxide concentration in a hydrogen-containing gas. In such a configuration, the shift converter and the purifier are required to be maintained at temperatures suitable for the reaction. The shift converter and the purifier are caused to rise in temperature by flowing a high-temperature hydrogen-containing gas therein. In addition, by supplying air to the shift converter and the purifier, the hydrogen-containing gas reacts with the air to generate reaction heat, which makes it possible to heat the shift converter and the purifier efficiently.

The air is supplied to the combustor to maintain combustion therein. If the combustor is deficient in air, then imperfect combustion occurs, causing flame extinguishment or generation of carbon monoxide. In order to prevent occurrence of the imperfect combustion, in a combustor disclosed in a patent document 1, the amount of air supplied to the combustor is determined based on a supply amount of the material gas so that a concentration of oxygen remaining in a gas exhausted from the combustor is maintained at a certain value or higher.

Patent document 2 and patent document 3 disclose a method of controlling the flow rate of air supplied to a burner provided in a reformer of a fuel cell. In the method disclosed in the patent document 2, the amount of air supplied to the burner is controlled based on the flow rate of a source fuel. In the method disclosed in the patent document 3, the amount of air supplied to the burner is controlled based on a power generation electric current or a response time associated with reforming a raw material. The patent document 3 further discloses, in a prior art description, a method in which an oxygen concentration in a combustion exhaust gas is analyzed and the air is supplied to the burner such that remaining oxygen concentration is 2 to 3% or higher.

Patent document 1: Japanese Laid-Open Patent Application Publication No. 2002-267159
Patent document 2: U.S. Pat. No. 3,212,181
Patent document 3: U.S. Pat. No. 3,718,391

DISCLOSURE OF THE INVENTION

Problems to be Solved by the Invention

However, the above described conventional configuration has a problem that, a combustion state in the combustor tends to be unstable in particular in a start-up state, causing flame extinguishment or imperfect combustion which tends to generate carbon monoxide.

The present invention has been developed to solve the above described problem, and an object of the present invention is to provide a hydrogen generator capable of suppressing flame extinguishment in a combustor or an increase in an amount of carbon monoxide in a combustion exhaust gas, a fuel cell system comprising the hydrogen generator, and an operation method thereof.

Means for Solving the Problem

Inventors researched intensively a cause of the unstable combustion state in the burner (combustor) in the above described conventional configuration, and found out the followings.

If reforming water is supplied to the reformer in a stage where the temperature of the hydrogen generator is sufficiently high (stage where the temperature has reached a level at which water is capable of being evaporated) in a case where in the start-up state of the hydrogen generator, the material gas which has flowed through the reformer is returned to the burner of the reformer through a gas passage in the interior of a system and is combusted to increase the temperature of the hydrogen generator, then the supplied reforming water is evaporated and increases its volume up to 1200 times or larger. Thereby, a combustible gas containing the material gas within the gas passage connecting the reformer to the burner is rapidly forced out into the burner, so that the burner temporarily contains an excessive fuel for some time. It may be presumed that this state is a cause of the flame extinguishment or the increase in the amount of carbon monoxide in the combustion exhaust gas. If supply of air to the shift converter or the purifier starts in the case where in the start-up state of the hydrogen generator, the material gas which has flowed through the reformer is returned to the burner of the reformer through the gas passage in the interior of the system and is combusted to increase the temperature of the hydrogen generator, the flow rate of the combustible gas containing the material gas within the gas passage connecting the reformer to the burner increases, so that the burner contains an excessive fuel. This state may be a cause of the flame extinguishment in the burner or the increase in the amount of carbon monoxide in the combustion exhaust gas. In addition, if the flow rate of the combustible gas containing the material gas within the gas passage connecting the reformer to the burner increases, then a back pressure of the burner increases and an air supply pressure of a combustion air supply device decreases relatively, so that deficiency of the amount of air supplied to the burner occurs. This state may also be a cause of the flame extinguishment or the increase in the amount of carbon monoxide in the combustion exhaust gas.

In view of the above, the inventors conceived that it was possible to suppress the flame extinguishment or progress of the imperfect combustion, by operating the combustion air supply device to increase the amount of air supplied to the burner, in association with the operation for starting supply of a gas different from the material gas to the reformer or to the gas passage connecting the reformer to the burner (starting supply of the reforming water to the reformer or starting supply of the air to the shift converter or to the purifier), in a case where the combustible gas containing the material gas which has flowed through the interior of the hydrogen generator is returned to the burner and is combusted for heating.

With a view to solving the above described problem, a hydrogen generator of the present invention comprises a reformer which generates a hydrogen-containing gas from a material gas; a first gas supply device which supplies the material gas; a combustor which combusts an exhaust gas exhausted from the reformer to heat the reformer; a combustion air supply device which supplies air to the combustor; a second gas supply device which supplies another gas different from the material gas to the reformer or to a passage connecting the reformer to the combustor; and a controller; wherein the controller is configured to control the combustion air supply device to increase an amount of the air supplied to the combustor, in association with start of supply of the another gas from the second gas supply device, in a state where the material gas is supplied from the first gas supply device to the reformer and the exhaust gas is combusted in the combustor.

In such a configuration, it is possible to suppress a relative decrease in the air supply amount according to an increase in a flow rate of a combustible gas containing the material gas which is supplied to the combustor, in association with start of supply of the gas different from the exhaust gas to the passage. As a result, the flame extinguishment in the combustor or the increase in carbon monoxide amount in the combustion exhaust gas can be suppressed.

In the above hydrogen generator, the second gas supply device may be a steam supply device which supplies a steam to the reformer, and the controller may be configured to control the combustion air supply device to increase the amount of the air supplied to the combustor, in association with start of supply of the steam from the steam supply device.

In such a configuration, it is possible to suppress a relative decrease in the air supply amount according to the increase in the flow rate of the combustible gas containing the material gas which is supplied to the combustor, which occurs when the supply of the steam to the reformer starts. As a result, the flame extinguishment in the combustor or the increase in carbon monoxide amount in the combustion exhaust gas can be suppressed.

Or, in the hydrogen generator, the steam supply device may include a water supply device and a water evaporator which is used for evaporating water supplied from the water supply device to generate the steam and for supplying the steam to the reformer, and the controller may be configured to control the combustion air supply device to increase the amount of the air supplied to the combustor, in association with start of supply of the water from the water supply device.

In such a configuration, it is possible to suppress a relative decrease in the air supply amount according to the increase in the flow rate of the combustible gas containing the material gas which is supplied to the combustor owing to the steam generated when the supply of the reforming water to the water evaporator starts. As a result, the flame extinguishment in the combustor or the increase in carbon monoxide amount in the combustion exhaust gas can be suppressed.

In the above hydrogen generator, the controller may be configured to control the combustion air supply device to gradually increase the amount of the air supplied to the combustor, before the water supply device starts supplying the water.

In such a configuration, since a rapid increase in the amount of air supplied to the combustor does not occur, it is possible to suppress, for example, an event that the flame is blown out and extinguished due to excess air.

The hydrogen generator may further comprise a shift converter which reduces a carbon monoxide concentration in the hydrogen-containing gas through a shift reaction. The second gas supply device may be a first air supply device which supplies the air to the shift converter. The controller may be configured to control the combustion air supply device to increase the amount of the air supplied to the combustor, in association with start of supply of the air from the first air supply device to the shift converter.

In such a configuration, it is possible to suppress a relative decrease in the air supply amount according to the increase in the flow rate of the combustible gas containing the material gas which is supplied to the combustor, which occurs when the supply of the air to the shift converter starts. As a result, the flame extinguishment in the combustor or the increase in carbon monoxide amount in the combustion exhaust gas can be suppressed.

The hydrogen generator may further comprise a purifier which reduces a carbon monoxide concentration in the hydrogen-containing gas through a preferential oxidation reaction. The second gas supply device may be a second air supply device which supplies the air to the purifier. The controller may be configured to control the combustion air supply device to increase the amount of the air supplied to the combustor, in association with start of supply of the air from the second air supply device to the purifier.

In such a configuration, it is possible to suppress a relative decrease in the air supply amount according to the increase in the flow rate of the combustible gas containing the material gas which is supplied to the combustor, which occurs when the supply of the air to the purifier starts. As a result, the flame extinguishment in the combustor or the increase in carbon monoxide amount in the combustion exhaust gas can be suppressed.

In the hydrogen generator, the controller may be configured to execute control to decrease the amount of the air supplied to the combustor after a lapse of a specified time after increasing the amount of the air supplied to the combustor.

In such a configuration, since the air supply amount is decreased according to the decrease in the amount of combustible gas containing the material gas which is supplied to the combustor (in association with the decrease in the amount of gas supplied to the combustor), it is possible to suppress, for example, an event that the flame is blown out and extinguished due to excess air.

A fuel cell system of the present invention comprises the above described hydrogen generator, and a fuel cell configured to generate an electric power using a hydrogen-containing gas supplied from the hydrogen generator.

In such a configuration, power generation can be carried out using as a fuel the hydrogen-containing gas supplied stably.

A method of operating a hydrogen generator of the present invention, including a reformer which generates a hydrogen-containing gas from a material gas; a first gas supply device which supplies the material gas; a combustor which combusts an exhaust gas exhausted from the reformer to heat the reformer; a combustion air supply device which supplies air to the combustor; and a second gas supply device which supplies another gas different from the material gas to the reformer or to a passage connecting the reformer to the combustor, the method comprising operating the combustion air supply device to increase an amount of the air supplied to the combustor, in association with start of supply of the another gas from the second gas supply device, in a state where the material gas is supplied from the first gas supply device to the reformer and the exhaust gas is combusted in the combustor.

In such a configuration, it is possible to suppress a relative decrease in the air supply amount according to the increase in the flow rate of the combustible gas containing the material gas which is supplied to the combustor, in association with start of supply of the gas different from the exhaust gas to the passage. As a result, the flame extinguishment in the combustor or the increase in carbon monoxide amount in the combustion exhaust gas can be suppressed.

A method of operating a fuel cell system of the present invention, including a reformer which generates a hydrogen-containing gas from a material gas; a first gas supply device which supplies the material gas; a combustor which combusts an exhaust gas exhausted from the reformer to heat the reformer; a combustion air supply device which supplies air to the combustor; a second gas supply device which supplies another gas different from the material gas to the reformer or to a passage connecting the reformer to the combustor; and a fuel cell configured to generate an electric power using the hydrogen-containing gas, the method comprising operating the combustion air supply device to increase an amount of the air supplied to the combustor, in association with start of supply of the another gas from the second gas supply device, in a state where the material gas is supplied from the first gas supply device to the reformer and the exhaust gas is combusted in the combustor.

In such a configuration, it is possible to suppress a relative decrease in the air supply amount according to the increase in the flow rate of the combustible gas containing the material gas which is supplied to the combustor, in association with start of supply of the gas different from the exhaust gas to the passage. As a result, the flame extinguishment in the combustor or the increase in carbon monoxide amount in the combustion exhaust gas can be suppressed.

Effects of the Invention

The present invention has the above described configuration and advantages described below. There can be provided a hydrogen generator capable of suppressing flame extinguishment or an increase in a carbon monoxide amount in a combustion exhaust gas in association with start of supply of a gas different from a material gas to a reformer or a gas passage connecting the reformer to a burner, in the state where combustion is conducted in a combustor to generate heat, using a combustible gas containing the material gas which has flowed through the interior of the hydrogen generator, a fuel cell system including the hydrogen generator, and an operation method thereof.

BRIEF DESCRIPTION OF THE DRAWINGS

FIG. 2 is a table showing, in each stage in a start-up state of the fuel cell system of the first embodiment, a total flow rate of a gas, an amount of a material gas supplied to a burner, a material gas concentration in a gas supplied to the burner, and an amount of air necessary for perfect combustion in the burner;

Figure 1:
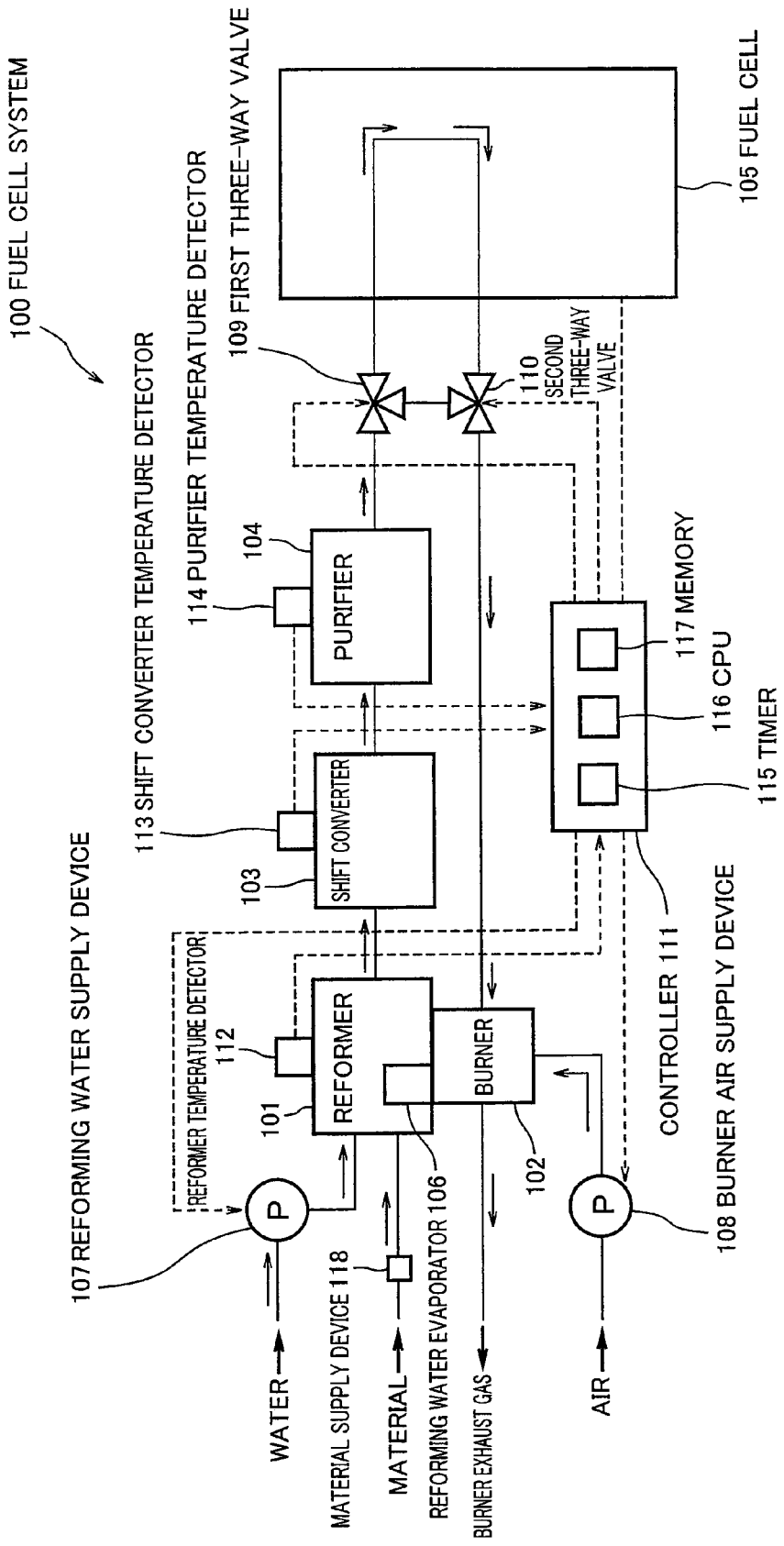
FIG. 1 is a block diagram showing an example of a schematic configuration of a fuel cell system according to a first embodiment.

DESCRIPTION OF THE REFERENCE NUMERALS 100 fuel cell system
101 reformer
102 burner
103 shift converter
104 purifier
105 fuel cell
106 reforming water evaporator
107 reforming water supply device
108 burner air supply device
109 first three-way valve
110 second three-way valve
111 controller
112 reformer temperature detector
113 shift converter temperature detector
114 purifier temperature detector
115 timer
116 CPU
117 memory
200 fuel cell system
201 reformer
202 burner
203 shift converter
204 purifier
205 fuel cell
207 shift converter air supply device
208 burner air supply device
209 first three-way valve
210 second three-way valve
211 controller
212 reformer temperature detector
213 shift converter temperature detector
214 purifier temperature detector
215 timer
216 CPU
217 memory
300 fuel cell system
301 reformer
302 burner
303 shift converter
304 purifier
305 fuel cell
307 purifier air supply device
308 burner air supply device
309 first three-way valve
310 second three-way valve 311 controller
312 reformer temperature detector
313 shift converter temperature detector
314 purifier temperature detector
315 timer
316 CPU
317 memory

BEST MODE FOR CARRYING OUT THE INVENTION

Hereinafter, preferred embodiments of the present invention will be described with reference to the drawings.

Embodiment 1

FIG. 1 is a block diagram showing an example of a schematic configuration of a fuel cell system according to a first embodiment. Hereinafter, a hardware and a control system of the fuel cell system of the present embodiment will be respectively described with reference to FIG. 1.

Initially, the hardware will be described below. As shown in FIG. 1, the hardware in a fuel cell system 100 according to the present embodiment includes a reforming water supply device 107 which is an example of a water supply device of the present invention and is configured to supply water (reforming water), a material supply device 118 which is an example of a first gas supply device of the present invention and is configured supply a hydrocarbon based material gas such as methane or propane, a reformer 101 which has a reforming catalyst used to generate a hydrogen-containing gas through a steam reforming reaction between the reforming water and a raw material to generate a hydrogen-containing gas, a burner 102 (combustor) which is configured to heat the reformer 101 to supply heat necessary for the steam reforming reaction, a burner air supply device 108 (combustion air supply device) which is configured to supply air necessary for combustion in the burner 102, a shift converter 103 which has a shift reaction catalyst used to reduce carbon monoxide in the hydrogen-containing gas exhausted from the reformer 101 through a shift reaction, a purifier 104 which has a preferential oxidation catalyst used to reduce the carbon monoxide in the hydrogen-containing gas exhausted from the shift converter 103 through a preferential oxidation reaction with oxygen in the air externally supplied, and a fuel cell 105 which causes the hydrogen-containing gas (fuel gas) exhausted from the purifier 104 to react with an oxidizing gas to generate an electric power. An exit of the fuel cell 105 from which the fuel gas is exhausted and an inlet of the burner 102 into which the fuel gas flows are coupled to each other by a pipe. The reformer 101 is provided with a reforming water evaporator 106 which is an example of a water evaporator of the present invention and is configured evaporate the reforming water to generate a steam such that the reforming water evaporator 106 is located adjacent the burner 102. The reforming water supply device 107 and the reforming water evaporator 106 form a steam supply device which is an example of a second gas supply device of the present invention.

As the reforming water supply device 107, a pump is used, for example. As the burner 102, a flame burner is used, for example. As the burner air supply device 108, a blower or pump is used, for example. As the fuel cell 105, a polymer electrolyte fuel cell is used, for example. As the material supply device 118, an electromagnetic valve coupled to a city gas line is used, for example.

A first three-way valve 109 is provided in a pipe through which the hydrogen-containing gas exhausted from the purifier 104 is supplied to the fuel cell 105. A second three-way valve 110 is provided in a pipe through which the hydrogen-containing gas (off gas) exhausted from the fuel cell 105 is supplied to the burner 102. The first three-way valve 109 is coupled to the second three-way valve 110 through a bypass passage so that the gas exhausted from the purifier 104 is directly delivered to the burner 102 so as to bypass the fuel cell 105.

Subsequently, the control system will be described. As shown in FIG. 1, the control system of the fuel cell system 100 of the present embodiment includes a controller 111 which is an example of a controller of the present invention, a reformer temperature detector 112 which detects a temperature of the reformer 101 (or a temperature of the reforming water evaporator 106), a shift converter temperature detector 113 which detects a temperature of the shift converter 103, and a purifier temperature detector 114 which detects a temperature of the purifier 104. The controller 111 includes a timer 115, a CPU 116, and a memory 117. The controller 111 is communicatively coupled to the reformer temperature detector 112, the shift converter temperature detector 113, the purifier temperature detector 114, the reforming water supply device 107, the burner air supply device 108, the first three-way valve 109, and the second three-way valve 110, in order to control the operation of the fuel cell system 100. The memory 117 contains operation programs and the like required for the operation of the fuel cell system 100, and suitably contains detection information and the like received in the controller 111. The fuel cell system is operated based on the operation programs, time information sent from the timer 115, etc. The controller 111, the CPU 116, and others may be plural in number. In other words, the fuel cell system 100 may be controlled in a centralized or distributed manner.

Subsequently, an outline of a power generation operation of the fuel cell system 100 will be described. In the interior of the reformer 101, the water (reforming water) supplied from the reforming water supply device 107 is evaporated into steam in the reforming water evaporator 106 due to heat supplied from the burner 102. The reforming catalyst inside the reformer 101 catalyzes a steam reforming reaction between the steam and the material gas supplied from the material supply device 118, to generate the hydrogen-containing gas containing hydrogen, carbon dioxide, and carbon monoxide. The controller 111 controls the amount of reforming water supplied from the reforming water supply device 107 and the amount of material gas supplied from the material supply device 118.

The hydrogen-containing gas generated in the reformer 101 is supplied to the shift converter 103. In the shift converter 103, the steam and the carbon monoxide in the hydrogen-containing gas are converted into hydrogen and carbon dioxide through the shift reaction. Through the reaction, carbon monoxide concentration in the hydrogen-containing gas is reduced. The hydrogen-containing gas supplied from the reformer 101 has a high-temperature. The gas increases the temperature of the shift converter 103 while flowing therein. The temperature of the shift converter 103 is detected by the shift converter temperature detector 113, which sends the detected information to the controller 111. The controller 111 controls the temperature of the shift converter 103 to be suitable for the shift reaction, based on the detected temperature, by using a shift converter temperature adjusting means (e.g., heater or cooling fan) which is not shown.

The hydrogen-containing gas whose carbon monoxide concentration has been reduced in the shift converter 103 is supplied to the purifier 104. In the purifier 104, through a preferential oxidation reaction catalyzed by the preferential oxidation catalyst, the carbon monoxide in the hydrogen-containing gas is preferentially oxidized and is converted into carbon dioxide. In the preferential oxidation reaction, oxygen in the air supplied from the air supply device which is not shown is used. The reaction enables further reduction of the carbon monoxide concentration in the hydrogen-containing gas. The hydrogen-containing gas supplied to the purifier 104 still has a high-temperature. The gas increases the temperature of the purifier 104 while flowing therein. The temperature of the purifier 104 is detected by the purifier temperature detector 114, and the detected information is sent to the controller 111. The controller 111 controls the temperature of the purifier 104 to be suitable for the preferential oxidation reaction, based on the detected temperature, by using a purifier temperature adjusting means (e.g., heater or cooling fan) which is not shown.

During normal power generation, the controller 111 controls the first three-way valve 109 so that a gas passage is formed to connect the purifier 104 to the fuel cell 105. Under the control, the hydrogen-containing gas, whose carbon monoxide concentration has been reduced in the purifier 104, is supplied to an anode side of the fuel cell 105. In addition, air or the like is supplied as an oxidizing gas from an oxidizing gas supply means which is not shown to a cathode side of the fuel cell 105. In the fuel cell 105, the hydrogen-containing gas supplied to the anode side and the oxidizing gas supplied to the cathode side react with each other, generating heat and electricity. The generated heat and electricity are taken out of the fuel cell 105 and is consumed by a user such as a household.

The anode side and the cathode side in the fuel cell 105 are separated from each other by a polymer electrolyte membrane and the like, and therefore the hydrogen-containing gas and the oxidizing gas are separately exhausted without being mixed. During the normal power generation, the controller 111 controls the second three-way valve 110 so that a gas passage is formed to connect the fuel cell 105 to the burner 102. Under the control, the hydrogen-containing gas exhausted from the fuel cell 105 is guided to the fuel gas inlet of the burner 102. In the burner 102, the hydrogen-containing gas is mixed with the air supplied from the burner air supply device 108 and is combusted. During the normal power generation, the controller 111 controls the amount of air supplied from the burner air supply device 108 so that a suitable combustion state is maintained. An exhaust gas (burner exhaust gas) exhausted from the burner 102 is discharged outside the system. The reformer 101 is heated by the burner 102. The controller 111 controls, for example, the amount of material gas supplied to the reformer 101, based on the detected information of the temperature which is received from the reformer temperature detector 112. Under the control, the amount of heat generated in the burner 102 is controlled based on the amount of gas supplied to the burner 102. As a result, the temperature of the reformer 101 is maintained to be suitable for the steam reforming reaction.

Subsequently, an operation in the start-up state which is a feature of the fuel cell system 100 of the present embodiment will be described. The fuel cell system 100 is configured to operate the burner air supply device 108 to increase the amount of air supplied to the burner 102 in association with the operation for supplying the reforming water from the reforming water supply device 107 in the start-up state. Hereinafter, the operation will be described in detail.

In the start-up state of the fuel cell system 100, the controller 111 causes the material supply device 118 to supply the material gas to the reformer 101 under the condition where the reforming water supply device 107 is in a stopped state. The controller 111 controls the first three-way valve 109 and the second three-way valve 110 to flow the gas exhausted from the purifier 104 in the bypass passage so as to bypass the fuel cell 105. Under the control, the material gas which has been supplied from the material supply device 118 flows in the reformer 101, the shift converter 103, the purifier 104, and the bypass passage and is combusted in the burner 102. The reformer 101 is heated by combustion heat supplied from the burner 102. The shift converter 103 and the purifier 104 are indirectly heated by flowing therein the high-temperature gas exhausted from the reformer 101.

In a stage where the temperature of the reformer 101 (reforming water evaporator 106) has been sufficiently increased, the controller 111 causes the reforming water supply device 107 to start its operation, so that the reforming water is supplied to the reformer 101. Since the temperature of the reforming water evaporator 106 is sufficiently high, the supplied reforming water is evaporated into the steam, which reacts with the material gas to generate the hydrogen-containing gas. Note that in the start-up state, the temperature of the reformer 101 is low, and therefore the reforming water is not evaporated, if it is supplied thereto. For this reason, if the reforming water is supplied just after the start-up, liquid water causes clogging, etc, in the gas passage. Such a problem can be avoided by supplying the reforming water to the reformer 101 after the temperature of the reforming water evaporator 106 has been sufficiently increased.

When the temperature of the reformer 101, the temperature of the shift converter 103, and the temperature of the purifier 104 have been increased up to levels at which the carbon monoxide concentration in the hydrogen-containing gas is capable of being sufficiently reduced, the controller 111 switches the first three-way valve 109 and the second three-way valve 110, so that the hydrogen-containing gas is supplied to the fuel cell 105. If the hydrogen-containing gas whose carbon monoxide concentration has not been sufficiently reduced is supplied to the fuel cell 105, then electrode catalyst and the like in the fuel cell 105 are poisoned, causing a serious problem such as reduced power generation efficiency. Such a problem can be avoided by supplying the hydrogen-containing gas to the fuel cell 105 after the temperature of the reformer 101, the temperature of the shift converter 103, and the temperature of the purifier 104 have been increased.

When the supply of the reforming gas starts under the control, the steam is generated, making a volume of the gas in the reformer expanded rapidly. The expanded gas forces out the gas present on a downstream side (downstream in gas flow, hereinafter expressed as such). At a time point when the supply of the reforming water starts, the steam, hydrogen, and others are not present on the downstream side, and the gas passage is filled with 100% of the material gas. Since the downstream gas is forced out by the steam, the amount of material gas supplied to the burner 102 increases. If the air is supplied to the burner 102 with a fixed amount, the material gas becomes excessive, causing imperfect combustion to occur. As a result, carbon monoxide with a concentration as high as several thousands ppm is generated. Or, because of deficiency of oxygen, the flame is extinguished in the burner 102. The carbon monoxide is harmful to human bodies and therefore is desirably lowered to 300 ppm or lower. To achieve stable start-up, it is necessary to supply sufficient air to the burner 102 when supply of the reforming water starts. For the purpose of suppressing generation of the carbon monoxide or the flame extinguishment when the supply of the reforming water starts, in the fuel cell system 100 of the present embodiment, the burner air supply device 108 is caused to operate to increase the amount of air supplied to the burner 102 when the supply of the reforming water starts (in association with the start of the supply of the reforming water). The controller 111 controls the burner air supply device 108 to effect such an operation. Specifically, for example, the controller 111 increases the number of rotations of a blower constituting the burner air supply device 108.

FIG. 2 is a table showing, in each stage in the start-up state of the fuel cell system in FIG. 1, the total flow rate of the gas, the amount of the material gas supplied to the burner, the material gas concentration in the gas supplied to the burner, and the amount of the air necessary for perfect combustion in the burner. The units of the flow rate and the supply amount are liter (L/min), and the unit of the concentration is percentage (%). Hereinafter, with reference to FIG. 2, the gas flow rate and the concentration in each stage in the start-up state will be described.

As shown in FIG. 2, in a stage where the reforming water is not supplied yet (left-side column in FIG. 2), the total flow rate of the gas flowing in a start-up fuel gas passage (gas passage connecting the reformer 101 to the burner 102 in the start-up state, i.e., gas passage extending from the reforming water evaporator 106 to the burner 102, through the shift converter 103, the purifier 104, the first three-way valve 109, the bypass passage, and the second three-way valve 110, and hereinbelow expressed as such) is equal to a supply amount Qmat of material gas. In this stage in the start-up state, the start-up fuel gas passage is filled with 100% concentration of material gas. Therefore, the amount of material gas supplied to the burner is equal to Qmat. When a volume ratio of the material gas to the air necessary for perfect combustion of the material gas is α, it is necessary to supply αQmat of air in order to accomplish the perfect combustion of the gas in the burner 102.

In a stage just after the supply of the reforming water has started (center column in FIG. 2), the reforming water is evaporated in the reforming water evaporator 106 to generate the steam. When the amount of steam generated is Qwat, the total flow rate of the gas flowing in the start-up fuel gas passage is a sum of the material gas and the steam Qmat+Qwat. Since the generated steam does not fill in the start-up fuel gas passage in a very short time, the material gas concentration in the gas supplied to the burner 102 is still 100% just after the supply of the reforming water. Therefore, the amount of material gas supplied to the burner 102 is Qmat+Qwat, which is by Qwat larger than the amount before the supply of the reforming water. Correspondingly, the amount of air necessary for the perfect combustion of material gas in the burner 102 is larger by α Qwat.

It is assumed that the supply amount Qmat of the material gas in the start-up state is 1.5 L/min and the supply amount of the reforming water is 3.6 mL/min. When the water is evaporated, its volume expands about 1700 times, and the generation amount Qwat of the steam is 6.12 L/min. Therefore, the necessary air supply amount is about five times larger. At this time, to suppress the flame extinguishment in the burner 102 or the increase in carbon monoxide amount in the combustion exhaust gas, it is necessary to control the air supply amount with a certain level of accuracy. Specifically, the amount of air supplied from the burner air supply device 108 is desirably increased to be made 1.3 to 5 times larger than the amount of air which is before the air is increased.

In a stage where a specified time lapses after the supply of the reforming water, and the steam fills and is well mixed with the material gas in the start-up fuel gas passage (right side column of FIG. 2), the total flow rate is still Qmat+Qwat. However, since the gas supplied to the burner contains the steam, the material gas concentration is lower than that just after the supply of the reforming water. If the decrease in the material gas resulting from the steam reforming reaction is not taken into account, the material gas concentration (volume ratio) in the gas supplied to the burner is Qmat×100/(Qmat+Qwat) %. Therefore, the net supply amount of the material gas supplied to the burner 102 is Qmat, and the air supply amount necessary for the perfect combustion of the gas in the burner 102 comes back to αQmat which is before the supply of the reforming water.

Figure 3:
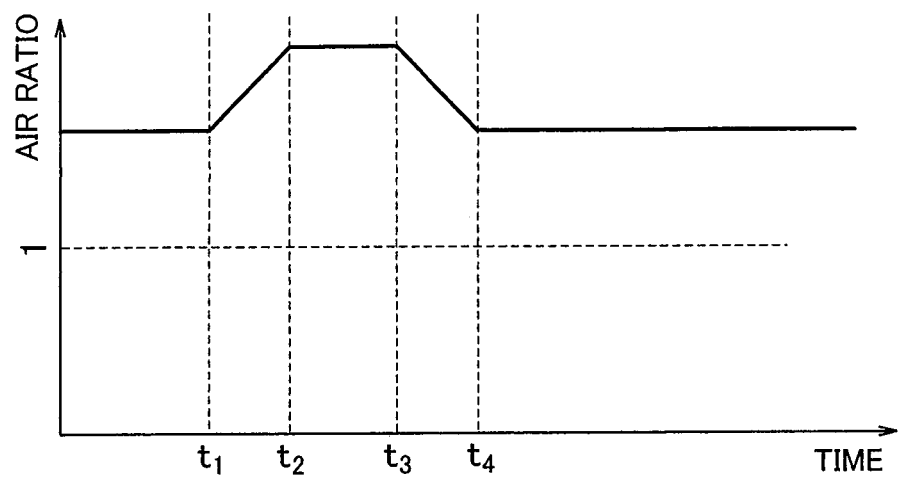
FIG. 3 is a view showing a change in the amount of air supplied to the burner after start-up of the fuel cell system of the first embodiment.

FIG. 3 is a view showing a change in an air ratio in the burner after the start-up of the fuel cell system of the first embodiment. The term "air ratio" refers to a value obtained by dividing an air-to-fuel ratio (air/fuel) by a ratio (theoretic value) of the air necessary for the perfect combustion to the fuel, which is calculated from number of moles, etc. In an actual operation, the perfect combustion is not achieved even though the air is supplied according to the theoretic value. For this reason, the air is supplied in an excess amount, and the air ratio is set to 1 or higher. The air ratio increases as the air supply amount increases. In FIG. 3, t1 indicates a time point when the air supply amount starts to be increased, t2 indicates a time point when the supply of the reforming water starts, t3 indicates a time point when the air supply amount starts to be deceased, and t4 indicates a time point when the air supply amount comes back to one before the supply of the reforming water.

As shown in FIG. 3, the air supply amount is desirably gradually increased in association with start of the operation for supplying the reforming water. This is because if the air supply amount is increased rapidly at the same time that the reforming water starts to be supplied, the flame in the burner is likely to be blown out and extinguished. The air supply amount may be increased smoothly or in a step shape. In addition, the air supply amount is desirably decreased gradually according to the material gas concentration in the gas. This is because the material gas concentration decreases as the amount of steam in the start-up fuel gas passage increases. Under the control, the air is supplied to the burner 102 with a suitable amount according to the supply amount or concentration of the material gas. As a result, stable start-up operation is achieved.

The timing when the air supply amount is increased is not limited to that illustrated in FIG. 3, but may be determined based on the timing of start of the supply of the reforming water. For example, in a case where the supply amount of the reforming water is gradually increased, the total flow rate of the gas is gradually increased, and therefore, the air supply amount may be started to be increased at the same time that the supply of the reforming water starts. In another case where there is little possibility that the flame is extinguished, because of apparatus configuration, the air amount may be increased at a time at the same time that the supply of the reforming water starts. The amount of air supplied to the burner 102 may be increased a specified time before or after the timing when the supply of the reforming water starts.

The timing when the air supply amount is decreased can be suitably controlled according to a specific configuration of each device, or a combustion condition such as the material gas concentration in the gas supplied to the burner. For this reason, the timing when the air supply amount is decreased cannot be determined theoretically or uniquely. Nonetheless, the timing when the air supply amount is decreased can be controlled based on, for example, the following thinking.

Using a simplified model, it is assumed that the whole amount of reforming water is evaporated, the gas flow rate increases at a time as soon as the reforming water is supplied, and thereafter the gas in a perfectly mixed state flows. In addition, it is assumed that mixing of the gas before the supply of the reforming water and the gas after the supply of the reforming water does not occur. Under the assumption, if time $V/(Q_{mat}+Q_{wat})$, where the volume of the start-up fuel gas passage is V, lapses, the gas containing the steam reaches the burner 102. Based on this value, the timing when the air supply amount is decreased can be controlled. Since the reaction does not occur ideally in the actual operation as described above, the timing when the air supply amount is decreased is desirably controlled in light of a reaction rate, a mixing rate, etc. For example, the above stated expansion rate of the reforming water is actually lower than the value of about 1700 times and fluctuates with time. Therefore, the air supply amount may be calculated from a result of measurement of actual values.

Alternatively, another model may be used. It is assumed that the steam reforming reaction starts as soon as the supply of the reforming water starts, thereafter the material gas is completely consumed and the hydrogen-containing gas flows. In addition, it is assumed that the gas before the supply of the reforming water and the gas after the supply of the reforming water are not mixed. Under the assumption, since the material gas concentration is zero at the time point when the hydrogen-containing gas reaches the burner 102 and there is not a chance that high-concentration carbon monoxide is generated, the air supply amount may be decreased. Since the reaction does not occur ideally in the actual operation as described above, the timing when the air supply amount is decreased is desirably controlled in light of the reaction rate, the mixing rate, etc.

The air supply amount need not be set to come back to its initial one. The air supply amount is desirably controlled to fall in a suitable range depending on the concentration of the material gas supplied to the burner 102 or the concentration of hydrogen supplied to the burner 102. For example, in a case where a city gas (13A) is used as the material gas, the air ratio is commonly set comparatively higher because of difficulty in achievement of the perfect combustion. In contrast, hydrogen is easily perfectly combusted, and therefore imperfect combustion is less likely to occur even if the air ratio is set comparatively lower under the condition in which the flow rate is equal. By controlling the air supply amount taking such parameters into account, energy efficiency can be further improved. In the present embodiment, without monitoring the parameters, the air supply amount is decreased when a specified time obtained from a model experiment or the like has lapsed. The control may be executed while monitoring the parameters, as a matter of course.

Figure 4:
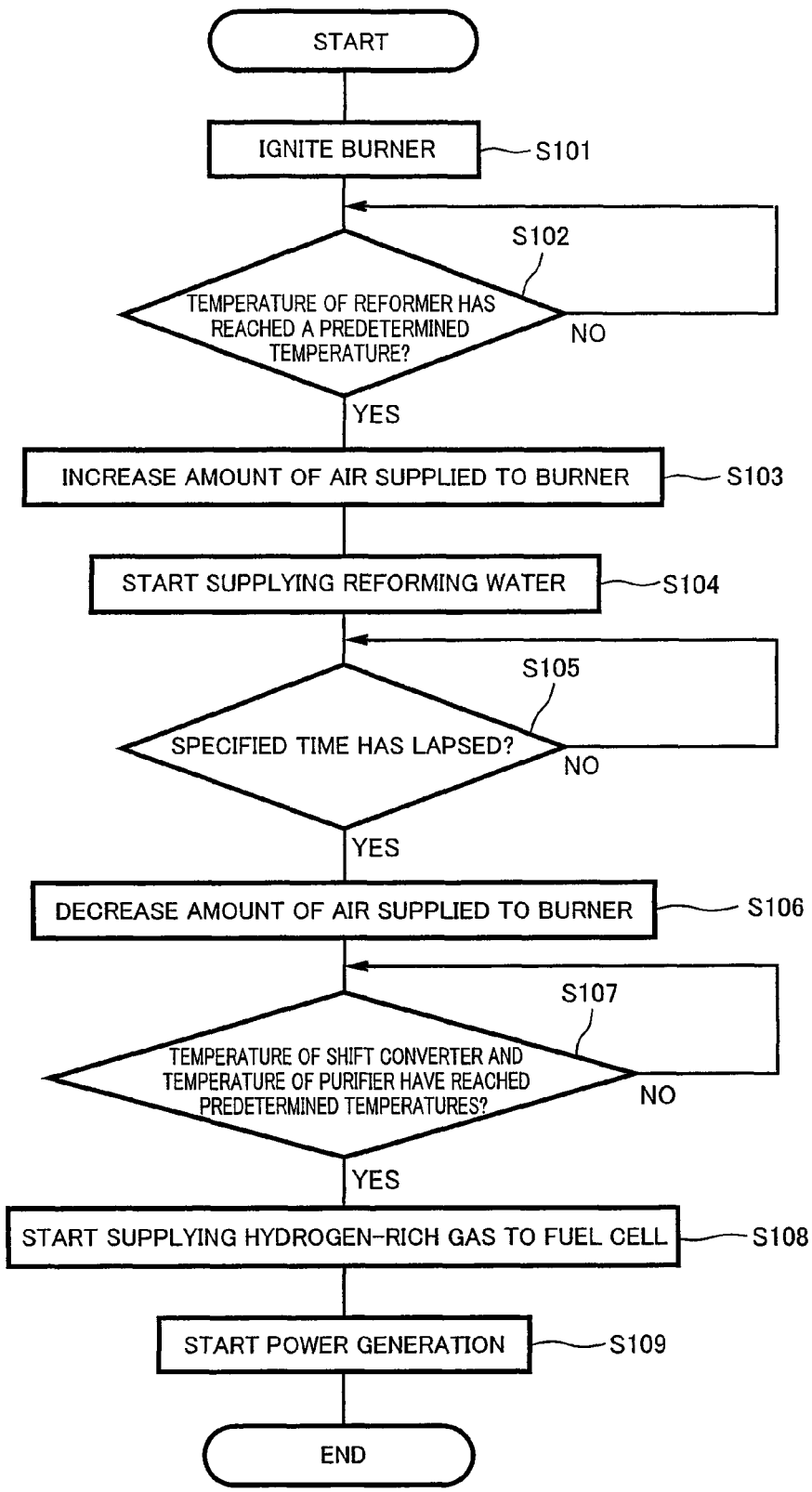
FIG. 4 is a flowchart showing control executed by a controller 111 in the start-up state of the fuel cell system of the first embodiment.

Subsequently, the operation method in the start-up state of the fuel cell system 100 of the present embodiment will be described. FIG. 4 is a flowchart showing control executed by the controller 111 in the start-up state of the fuel cell system of the first embodiment. Hereinafter, the operation method will be described with reference to Figures.

Upon the start of the operation of the fuel cell system 100, initially, the material supply device 118 starts supplying the material, and the burner 102 is ignited (step S101). At this time, the material gas flows to the burner 102 through the bypass passage so as to bypass the fuel cell 105. Then, it is determined whether or not the temperature of the reformer 101 which is detected by the reformer temperature detector 112 has reached a predetermined temperature (step S102). If it is determined that the temperature has reached the predetermined temperature, the controller 111 controls the burner air supply device 108 to increase the amount of air supplied to the burner 102 (step S103). The time point when step S103 starts is t1 in FIG. 3. Then, the reforming water supply device 107 starts supplying the reforming water (step S104). The time point when step S104 starts is t2 in FIG. 3. When a specified time lapses after starting supplying the reforming water (step S105), the controller 111 controls the burner air supply device 108 to decrease the amount of air supplied to the burner 102 (step S106). The time point when step S106 starts is t3 in FIG. 3. The air supply amount is gradually decreased, and at t4, its level is equal to one at t1. After step S106, if the temperature of the shift converter 103 which is detected by the shift converter temperature detector 113 has reached a predetermined temperature and the temperature of the purifier 104 which is detected by the purifier temperature detector 114 has reached a predetermined temperature (step S107), the controller 111 switches the first three-way valve 109 and the second three-way valve 110 to start the supply of the hydrogen-containing gas from the purifier 104 to the fuel cell 105 (step S108). Upon the start of the supply of the hydrogen-containing gas, power generation starts (step S109), and the start-up operation terminates.

As described above, the timing when the air supply amount is controlled so as to be increased in step S103 is determined based on the timing when the supply of the reforming water starts in step S104. The predetermined temperature used in the determination in step S102 need not be high enough to evaporate the reforming water but may be set lower considering the time required to increase the air supply amount and an increase rate of the temperature. In the example illustrated in FIG. 4, after increasing the amount of air supplied to the burner, the supply of the reforming water starts. However, the order of increasing the air supply amount and the start of the supply of the reforming water may be such that one of them is earlier than the other or otherwise they may occur at the same time. The predetermined time used in the determination in step S105 is determined by conducting a model experiment or the like and by studying the timing when the amount of air supplied to the burner 102 is decreased.

The phrase "control the burner air supply device 108 to increase the amount of air supplied to the burner 102" does not always mean that the amount of air supplied to the burner 102 is actually increased, but may mean "execute control toward (i.e., to allow for) increasing the amount of air supplied to the burner 102, with respect to the burner air supply device 108." Specifically, when the burner air supply device 108 is a control valve for controlling the flow rate of the air, the opening degree of the control valve may be increased. When the burner air supply device 108 is a blower, the number of rotations of the blower may be increased. In a case where the back pressure of the burner increases and the air supply pressure relatively decreases, according to the increase in the amount of material gas supplied to the burner, in association with the start of supply of the water to the reformer, it is presumed that the amount of air actually supplied to the burner does not increase so as to meet a desired air ratio. However, by "executing control toward increasing the amount of air supplied to the burner 102, with respect to the burner air supply device 108" as described above, the air supply pressure increases according to the increased back pressure. This suppresses deficiency of the air, which effectively suppress the problem of at least the flame extinguishment and the increase in carbon monoxide in the combustion exhaust gas.

With the above described configuration and operation, the fuel cell system 100 of the present embodiment executes control toward increasing the amount of air supplied to the burner 102, with respect to the burner air supply device 108, in association with the start of supply of the reforming water, it is possible to suppress generation of carbon monoxide which tends to be generated at the start of supply of the reforming water or the flame extinguishment in the burner which tends to occur at the start of supply of the reforming water.

In situations other than the start-up state, the supply of the reforming water from the reforming water supply device 107 may start during the operation under the state where combustion is conducted in the combustor using the combustible gas containing the material gas which has flowed through the interior of the hydrogen generator. In such situations, the flame extinguishment or the increase in the carbon monoxide in the combustion exhaust gas can be suppressed by executing control toward increasing the amount of air supplied to the burner 102, with respect to the burner air supply device 108, in association with the start of the supply of water from the reforming water supply device 107.

Embodiment 2

Figure 5:
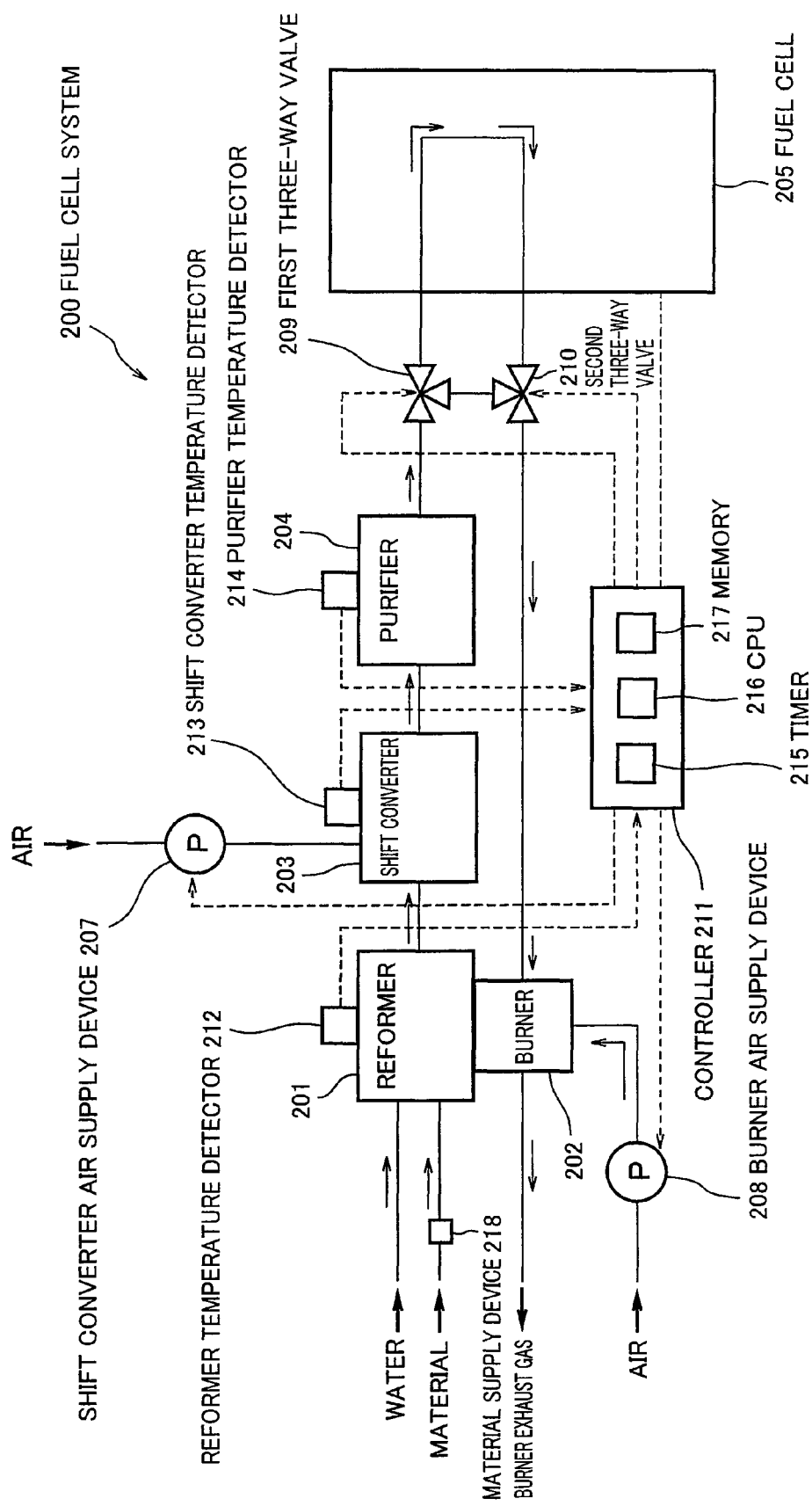
FIG. 5 is a block diagram showing an example of a schematic configuration of a fuel cell system according to a second embodiment.

In the fuel cell system 100 of the first embodiment, the amount of air supplied to the burner is increased in association with the start of the supply of water to the reformer, while in a fuel cell system 200 of a second embodiment of the present invention, the amount of air supplied to the burner is increased in association with start of the supply of the air to the shift converter. FIG. 5 is a block diagram showing an example of a schematic configuration of the fuel cell system of the second embodiment. Hereinafter, the fuel cell system 200 of the present embodiment will be described with reference to Figures.

The fuel cell system 200 has a configuration in which the reforming water supply device 107 is omitted from the fuel cell system 100 and a shift converter air supply device 207 which is an example of the second gas supply device of the present invention is added thereto. The other configuration is identical to that of the fuel cell system 100. Therefore, the same components as those in the fuel cell system 100 are identified by the same names and will not be further described.

The shift converter air supply device 207 is constituted by, for example, a pump or a blower, and is configured to supply the air to the shift converter 203 in accordance with the control of a controller 211. By supplying the air to the shift converter 203, the material gas or the hydrogen-containing gas flowing therein reacts with oxygen in the air, generating heat. This contributes to quickly increasing the temperature of the shift converter 203 or to maintaining the temperature of the shift converter 203 to be suitable for the shift reaction.

In a period just after the start-up of the fuel cell system 200, the shift converter air supply device 207 is in a stopped state. In a stage where the temperature detected by the shift converter temperature detector 213 has reached a predetermined temperature after the start-up, the supply of air to the shift converter 203 starts. The total flow rate of the gas flowing in the start-up fuel gas passage increases because of introduction of a new gas even though the concentration of the material gas in the gas supplied to the burner 202 is constant, as in the first embodiment. Therefore, there is a possibility that the flame extinguishment occurs in the burner 202 or carbon monoxide amount in the combustion exhaust gas increases, if the amount of air supplied to the burner 202 is constant. In the fuel cell system 200, by executing control toward increasing the amount of air supplied to the burner 202, with respect to the burner air supply device 208, in association with the supply of the air to the shift converter 203, the flame extinguishment in the burner 202 or the increase in carbon monoxide amount in the combustion exhaust gas in the start-up state can be suppressed.

A method of controlling how to increase the air supply amount and adjustment of the timing when the air supply amount is controlled to be increased in the present embodiment are similar to those of the first embodiment, and will not be further described. In the present embodiment, what is supplied to the start-up fuel gas passage is not water but air. Therefore, it is not necessary to consider volume expansion owing to evaporation of the water, and the burner air supply device 208 may be controlled to increase the amount of air supplied to the burner 202 with a rate corresponding to the amount of air to be supplied. In the present embodiment, by supplying the air to the start-up fuel gas passage inside the shift converter 203, oxygen in the air reacts with hydrogen or the like in the hydrogen-containing gas and is consumed. As a result, the gas contracts and the total flow rate decreases. It is desirable to control the amount of air supplied from the burner air supply device 208 to the burner 202 in view of such an effect.

As in the first embodiment, in the present embodiment, the phrase "control the burner air supply device 208 to increase the amount of air supplied to the burner 202" does not always mean that the amount of air supplied to the burner 202 is actually increased, but may mean "execute control toward increasing the amount of air supplied to the burner 202, with respect to the burner air supply device 208." This is because, it may be presumed that the back pressure of the burner rises to a considerable extent and the air supply pressure relatively decreases, if the air is supplied to the shift converter in a larger amount.

In situations other than the start-up state, the supply of the air from the shift converter air supply device 207 may start during the operation under the state where combustion is conducted in the burner using the combustible gas containing the material gas which has flowed through the interior of the hydrogen generator. In such situations, the flame extinguishment or increase in carbon monoxide amount in the combustion exhaust gas can be suppressed by executing control toward increasing the amount of air supplied to the burner 202, with respect to the burner air supply device 208, in association with the start of the supply of air from the shift converter air supply device 207.

Embodiment 3

Figure 6:
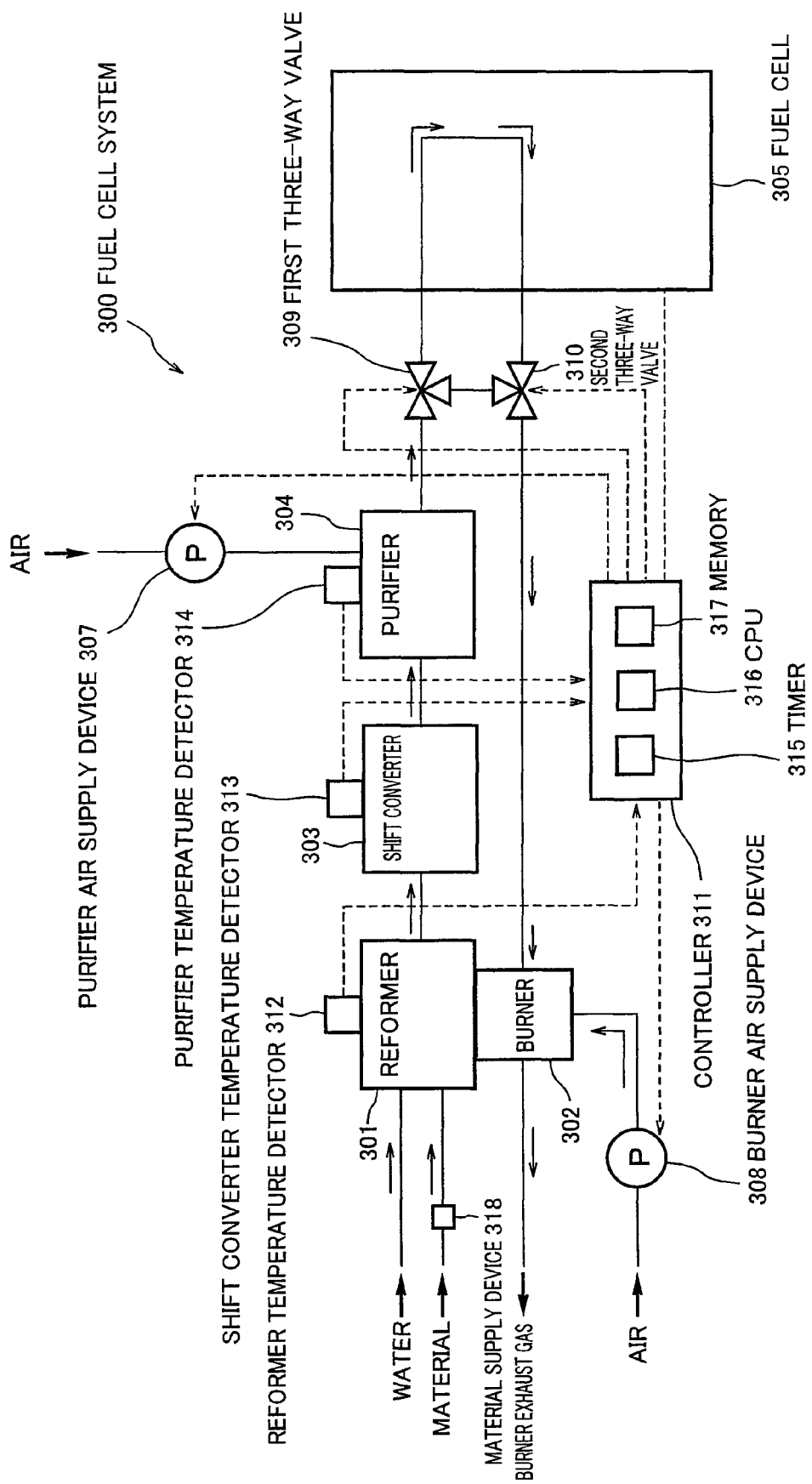
FIG. 6 is a block diagram showing an example of a schematic configuration of a fuel cell system according to a third embodiment.

In the fuel cell system 100 of the first embodiment, the burner air supply device 108 is controlled to increase the amount of air supplied to the burner in association with the start of the supply of reforming water to the reformer, while in a fuel cell system 300 of a third embodiment of the present embodiment, a burner air supply device 308 is controlled to increase the amount of air supplied to the burner in association with the start of supply of the air to the purifier. FIG. 6 is a block diagram showing an example of a schematic configuration of the fuel cell system of the third embodiment. Hereinafter, the fuel cell system 300 of the present embodiment will be described with reference to Figures.

The fuel cell system 300 has a configuration in which the reforming water supply device 107 is omitted from the fuel cell system 100 and a purifier air supply device 307 which is an example of the second gas supply device of the present invention and is not illustrated in the first embodiment and the second embodiment, is a target to be controlled. The other configuration is identical to that of the fuel cell system 100. Therefore, the same components as those in the fuel cell system 100 are identified by the same names and will not be further described.

The purifier air supply device 307 is constituted by, for example, a pump or a blower, and is configured to supply the air to a purifier 303 in accordance with the control of the controller 211. The purifier 203 reduces the carbon monoxide concentration in the hydrogen-gas containing gas through the preferential oxidation reaction. The preferential oxidation reaction requires oxygen for oxidizing carbon monoxide. By supplying the air from the purifier air supply device 307 to the purifier 203, oxygen required for the preferential oxidation reaction is supplied. In addition, by supplying the air to the purifier 203, carbon monoxide or hydrogen in the gas flowing therein reacts with oxygen, generating heat. This contributes to quickly increasing the temperature of the purifier 204 or to maintaining the temperature of the purifier 204 to be suitable for the preferential oxidization reaction.

In a period in a start-up state of the fuel cell system 300, the purifier air supply device 307 is in a stopped state just after the start-up. In a stage where the temperature detected by the purifier temperature detector 313 has reached a predetermined temperature, the supply of the air to the purifier 303 starts. At this time, the total flow rate of the gas flowing in the start-up fuel gas passage increases because of introduction of a new gas even though the concentration of the material gas in the gas supplied to the burner 302 is constant, as in the first embodiment. Therefore, there is a possibility that the flame extinguishment occurs in the burner 302 or carbon monoxide concentration in the combustion exhaust gas increases, if the amount of air supplied to the burner 302 is constant. In the fuel cell system 300, by executing control toward increasing the amount of air supplied to the burner 302, with respect to the burner air supply device 308, in association with the supply of the air to the shift converter 303, the flame extinguishment in the burner 302 or the increase in carbon monoxide amount in the combustion exhaust gas in the start-up state can be suppressed.

A method of controlling how to increase the air supply amount and adjustment of the timing when the air supply amount is controlled to be increased in the present embodiment are similar to those of the first embodiment, and will not be further described. In the present embodiment, what is supplied to the start-up fuel gas passage is not water but air. Therefore, it is not necessary to consider volume expansion owing to evaporation of the water, and the amount of air supplied to the burner 302 may be increased with a rate corresponding to the amount of air to be supplied. In the present embodiment, by supplying the air to the start-up fuel gas passage inside the purifier 304, oxygen in the air reacts with hydrogen in the hydrogen-containing gas and is consumed. As a result, the gas contracts and the total flow rate decreases. It is desirable to control the amount of air supplied from the burner air supply device 308 to the burner 302 in view of such an effect.

As in the first embodiment, in the present embodiment, the phrase "control the burner air supply device 308 to increase the amount of air supplied to the burner 302" does not always mean that the amount of air supplied to the burner 302 is actually increased, but may mean that "execute control toward increasing the amount of air supplied to the burner 302, with respect to the burner air supply device 308." This is because, it may be presumed that the back pressure of the burner rises to a considerable extent and the air supply pressure relatively decreases, if the air is supplied to the purifier in a larger amount.

In situations other than the start-up state, the supply of the air from the purifier air supply device 307 may start during the operation under the state where combustion is conducted in the burner using the combustible gas containing the material gas which has flowed through the interior of the hydrogen generator. In such situations, the flame extinguishment or the increase in carbon monoxide in the combustion exhaust gas due to the imperfect combustion can be suppressed, by executing control toward increasing the amount of air supplied to the burner 302, with respect to the burner air supply device 308, in association with the start of the supply of air from the purifier air supply device 307.

Modifications of First to Third Embodiments

A plurality of the first to third embodiments may be combined and incorporated into a single fuel cell system. For example, the fuel cell system may include the reforming water supply device and the purifier air supply device, and may be configured to increase the amount of air supplied to the burner in association with start of the operation for supplying the reforming water or start of the operation for supplying the air to the purifier. The order of the timing when gases such as the steam or the air which are different from the material gas are supplied and the timing when the control toward increasing the amount of air supplied to the burner starts may be such that one of them is earlier than the other or otherwise they may occur at the same time. It suffices that the timing when the control toward increasing the amount of air supplied to the burner starts is determined based on the timing when another gases are supplied.

Whereas the first to third embodiments are configured as the fuel cell systems each including the fuel cell, they may alternatively be configured as the hydrogen generator including the reformer, the shift converter, and the purifier (or one of the shift converter and the purifier) without including the fuel cell, or the operation method of the hydrogen generator. Such a configuration is, for example, useful as the hydrogen generator which supplies the hydrogen-containing gas to the fuel cell and is capable of suppressing the flame extinguishment in the burner or the increase in the carbon monoxide amount in the combustion exhaust gas in the start-up state, or the operation method of the hydrogen generator.

Whereas the reformer, the shift converter, and the purifier are described above as being separate, the reformer, the shift converter and the purifier may be disposed in a single apparatus to form an integrated hydrogen generator.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A fuel cell system of the present embodiment is useful as a hydrogen generator capable of suppressing flame extinguishment in a burner or generation of carbon monoxide in association with start of supply of a gas different from a material gas to a reformer or to a gas passage connecting the reformer to the burner, in the state where combustion is conducted in a combustor using a combustible gas containing a material gas that has flowed through the interior of the hydrogen generator, a fuel cell system including the hydrogen generator, and an operation method thereof.

The invention claimed is:

1. A hydrogen generator comprising:
a reformer which generates a hydrogen-containing gas from a material gas;
a first gas supply device which supplies the material gas;
a combustor which combusts an exhaust gas exhausted from said reformer to heat said reformer;
a combustion air supply device which supplies air to said combustor;
a second gas supply device which supplies another gas different from the material gas to at least one of said reformer and a passage connecting said reformer to said combustor; and
a controller,
wherein said controller is configured to control said combustion air supply device to increase an amount of the air supplied to said combustor, in association with start of supply of the another gas from said second gas supply device, in a state where the material gas is supplied from said first gas supply device to said reformer and the exhaust gas is combusted in said combustor.

2. The hydrogen generator according to claim 1, wherein:
said second gas supply device is a steam supply device which supplies a steam to said reformer, and
said controller is configured to control said combustion air supply device to increase the amount of the air supplied to said combustor, in association with start of supply of the steam from said steam supply device.

3. The hydrogen generator according to claim 2, wherein:
said steam supply device includes a water supply device and a water evaporator which is used for evaporating water supplied from said water supply device to generate the steam and for supplying the steam to said reformer, and
said controller is configured to control said combustion air supply device to increase the amount of the air supplied to said combustor, in association with start of supply of the water from said water supply device.

4. The hydrogen generator according to claim 3,
wherein said controller is configured to control said combustion air supply device to gradually increase the amount of the air supplied to said combustor, before said water supply device starts supplying the water.

5. The hydrogen generator according to claim 1, further comprising:
a shift converter which reduces a carbon monoxide concentration in the hydrogen-containing gas through a shift reaction, wherein:
said second gas supply device is a first air supply device which supplies the air to said shift converter, and
said controller is configured to control said combustion air supply device to increase the amount of the air supplied to said combustor, in association with start of supply of the air from said first air supply device to said shift converter.

6. The hydrogen generator according to claim 1, further comprising:
a purifier which reduces a carbon monoxide concentration in the hydrogen-containing gas through a preferential oxidation reaction, wherein:
said second gas supply device is a second air supply device which supplies the air to said purifier, and
said controller is configured to control said combustion air supply device to increase the amount of the air supplied to said combustor, in association with start of supply of the air from said second air supply device to said purifier.

7. The hydrogen generator according to claim 1,
wherein said controller is configured to execute control to decrease the amount of the air supplied to said combustor after a lapse of a specified time after increasing the amount of the air supplied to said combustor.

8. A fuel cell system comprising:
the hydrogen generator according to any one of claims 1 to 7; and
a fuel cell configured to generate an electric power using a hydrogen-containing gas supplied from said hydrogen generator.

* * * * *